United States Patent
Ahn et al.

(10) Patent No.: US 9,508,183 B2
(45) Date of Patent: Nov. 29, 2016

(54) IMAGE PROCESSING APPARATUS AND METHOD FOR GENERATING 3D IMAGE THEREOF

(71) Applicant: SAMSUNG ELECTRONICS CO., LTD., Suwon-si (KR)

(72) Inventors: Won-seok Ahn, Yongin-si (KR); Beom-joon Kim, Suwon-si (KR); Jin-woo Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 14/097,322

(22) Filed: Dec. 5, 2013

(65) Prior Publication Data

US 2014/0152658 A1  Jun. 5, 2014

(30) Foreign Application Priority Data

Dec. 5, 2012 (KR) ........................ 10-2012-0140571

(51) Int. Cl.
*G06T 15/00* (2011.01)
*H04N 13/00* (2006.01)

(52) U.S. Cl.
CPC ........... *G06T 15/00* (2013.01); *H04N 13/0018* (2013.01); *H04N 13/0025* (2013.01)

(58) Field of Classification Search
None
See application file for complete search history.

(56) References Cited

U.S. PATENT DOCUMENTS

| | | | | |
|---|---|---|---|---|
| 6,215,496 B1* | 4/2001 | Szeliski | ................. | G06T 15/04 345/419 |
| 6,501,446 B1* | 12/2002 | De Haan | ............... | G09G 3/2022 345/60 |
| 2010/0013853 A1* | 1/2010 | Takatori | ............ | G02F 1/134336 345/611 |
| 2011/0007089 A1* | 1/2011 | Bell | ....................... | G09G 3/003 345/593 |
| 2011/0026809 A1* | 2/2011 | Jeong | .................... | G06T 7/0022 382/154 |

* cited by examiner

*Primary Examiner* — Said Broome
(74) *Attorney, Agent, or Firm* — Sughrue Mion, PLLC

(57) ABSTRACT

A method including acquiring a source image and depth information of the source image, determining, using depth information, an overlapping region in which some pixels of a source image are shifted and a plurality of pixels overlap, calculating a weight for the overlapping region with a processor, using distance information with respect to a foreground region of the source image and a background region of the source image, generating, using the depth information and the overlapping region, a foreground-depth image in which the foreground region is extended and a background-depth image in which the background region is extended, generating a foreground image using the source image and the foreground-depth image, generating a background image using the source and the background-depth image, and generating, using the weight from the overlapping region, at least one of a left-eye image and a right-eye image by synthesizing the foreground image and the background image.

15 Claims, 10 Drawing Sheets

IMAGE PROCESSING APPARATUS AND METHOD FOR GENERATING 3D IMAGE THEREOF

CROSS-REFERENCE TO RELATED APPLICATION

This application claims priority from Korean Patent Application No. 10-2012-0140571, filed on Dec. 5, 2012, in the Korean Intellectual Property Office, the disclosure of which is incorporated herein by reference in its entirety.

BACKGROUND

1. Field

Exemplary embodiments described herein relate to an image processing apparatus and a method for generating a three-dimensional (3D) image thereof, and more particularly to an image processing apparatus and a method for generating a 3D image thereof capable of generating a left-eye image and a right-eye image with respect to a source image.

2. Description of the Related Art

In general, image processing apparatuses, which generate a left-eye image and a right-eye image with respect to a source image, use a matting-based rendering technology to determine a matting region for a foreground image and a background image of each of the left-eye image and the right-eye image. The matting-based rendering technology also performs rendering through user interaction and object-based simple edge expansion.

When the matting region for the foreground and background images is determined through the matting-based rendering technology, the image processing apparatus mixes pixel values of the foreground image and pixel values of the background image and generates a left-image and a right-image with respect to the source image. The mixing of pixel values is based on the matting region determined with respect to each of the left-eye image and the right-eye image.

However, using the matting-based rendering technology of the related art causes an overlapping region between the foreground image and the background image to not be naturally processed. This is because the rendering is performed on the foreground image and background image based on the determined matting region. That is, since the matting region is determined through the object-based simple edge expansion, the matting region is determined to be smaller or greater than the overlapping region between the foreground image and background image. Therefore, when the rendering for the foreground image and the background image with respect to each of the left-eye image and the right-eye image is performed based on the matting region, the overlapping region between the foreground image and the background image is not naturally processed.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments perform a natural rendering of an overlapping region between a foreground image and a background image with respect to each of a left-eye image and a right-eye image when the left-eye image and the right-eye image are generated from a source image.

According to an aspect of an exemplary embodiment, there is provided a three-dimensional (3D) image generating method. The method may include: acquiring a source image and depth information of the source image; determining an overlapping region in which some pixels of the source image are shifted using the depth information and a plurality of pixels overlap; calculating a weight for the overlapping region with a processor, using distance information with respect to a foreground region of the source image and a background region of the source image; generating, using the depth information and the overlapping region, a foreground-depth image in which the foreground region is extended and a background-depth image in which the background region is extended; generating a foreground image using the source image and the foreground-depth image; generating a background image using the source image and the background-depth image; and generating, using the weight from the overlapping region, at least one of a left-eye image and a right-eye image with respective to the source image by synthesizing the foreground image and the background image.

The calculating a weight may include calculating the weight so that among the pixels of the overlapping region, pixels closer to the foreground region have higher weights than pixels closer to the background region.

The generating one of a left-eye image and a right-eye image with respect to the source image may include adjusting a pixel value of a region having a first weight among the overlapping region based on a pixel value of the foreground image and adjusting a pixel value of a region having a second weight among the overlapping region based on a pixel value of the background image, and the first weight is higher than the second weight.

The determining may further include determining a hole region generated by shifting some of the pixels of the source image according to the depth information.

The method may further include, in response to determining the overlapping region and the hole region, removing noise from the overlapping region and the hole region.

The method may further include, in response to removing the noise from the overlapping region and the hole region, performing pre-processing on the depth information based on the noise-removed overlapping region and hole region.

The foreground-depth image in which the foreground region is extended and the background-depth image in which the background region is extended may be generated based on the depth information and at least one of the overlapping region and the hole region.

The method may further include, in response to generating the foreground-depth image in which the foreground region is extended and the background-depth image in which the background region is extended, performing post-processing on the foreground-depth image and the background-depth image.

The source image may be a two-dimensional (2D) image.

According to another aspect of an exemplary embodiment, there is provided an image processing apparatus which generates a three-dimensional (3D) image. The image processing apparatus may include: a receiver configured to receive a source image and depth information of the source image; a region determination unit configured to determine, using the depth information, an overlapping region in which some pixels of the source image are shifted and a plurality of pixels overlap; a weighting unit configured to calculate, using distance information with respect to a foreground region of the source image and a background region of the source image, a weight of the determined overlapping region; a depth image generator configured to generate, using the depth information and the overlapping region, a foreground-depth image in which the foreground region is extended and a background-depth image in which the background region is extended; and a 3D image generator configured to: generate a foreground image using the source image and the foreground-depth image; generate a background image using the source image and the background-depth image; synthesize, using the calculated weight, the foreground image and the background image; generate at least one of a left-eye image and a right-eye image with respect to the source image.

The weighting unit may be configured to calculate the weight so that among the pixels of the overlapping region, pixels closer to the foreground region have higher weights than pixels closer to the background region.

The 3D image generator may be further configured to adjust, using a pixel value of the foreground image, a pixel value of a region having a first weight among the overlapping region; adjust, using a pixel value of the background image, a pixel value of a region having a second weight among the overlapping region, and the first weight is higher than the second weight.

The region determination unit may be further configured to determine a hole region generated by shifting some of the pixels of the source image using the depth information.

The image processing apparatus may further include a noise processing unit configured to remove noise from the overlapping region and the hole region.

The image processing apparatus may further include a pre-processing unit configured to perform pre-processing on the depth information using the noise-removed overlapping region and the noise-removed hole region.

The 3D image generator may generate the foreground-depth image in which the foreground region is extended and the background-depth image in which the background region is extended using the depth information and at least one of the overlapping region and the hole region.

The image processing apparatus may further include a post-processing unit configured to perform post-processing on the foreground-depth image and the background-depth image. In response to the foreground-depth image in which the foreground region is extended and the background-depth image in which the background region is extended being generated, the post-processing unit performs the post-processing on the foreground-depth image and the background-depth image.

The source image may be a two-dimensional (2D) image.

According to another aspect of an exemplary embodiment, there is provided an image processing apparatus which generates a three-dimensional (3D) image. The image processing apparatus may include: a receiver which receives a source image and depth information associated with the source image, the source image may include a foreground region in which a foreground image is displayed and a background region in which a background image is displayed, the depth information may indicate the foreground region and the background region; and a controller which generates the 3D image by performing a pixel shifting operation in which pixels of one of the foreground region and the background region are shifted by a predetermined number of pixels without shifting pixels of the other region, determining, based on the pixel shifting operation, at least one of an overlapping region in which pixels overlap and a hole region in which there are no pixels, and generating a left-eye image and a right-eye image using the foreground image, the background image, and at least one of the overlapping region and the hole region.

According to the above-described exemplary embodiments, the image processing apparatus may perform a more natural rendering on an overlapping region in which a foreground image and a background image of each of a left-eye image and a right-eye image overlap each other when the left-eye image and the right-eye image with respect to a source image are generated.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
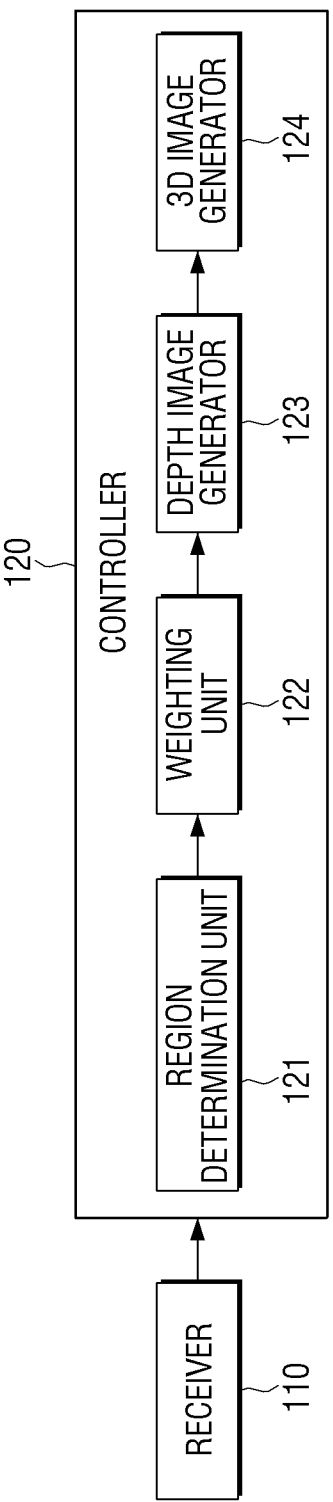
FIG. 1 is a block diagram illustrating an image processing apparatus according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
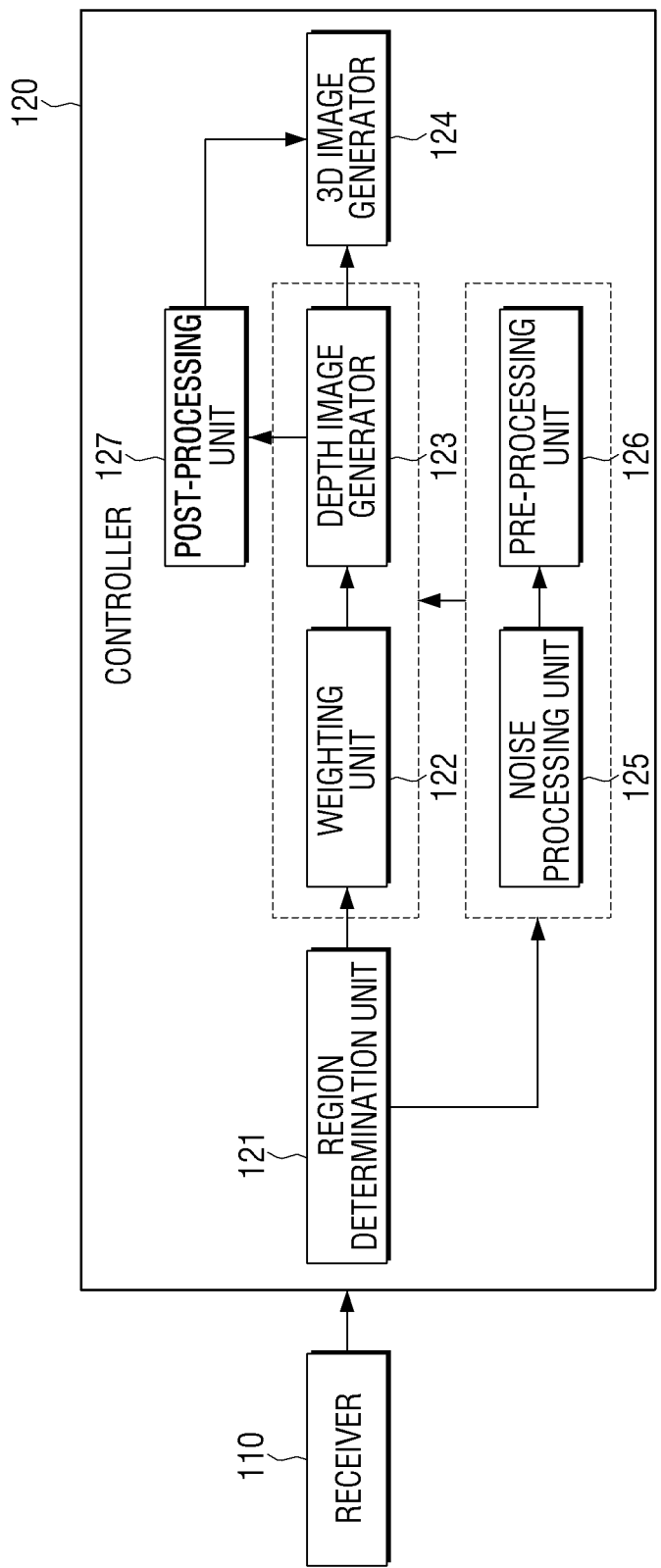
FIG. 2 is a detailed block diagram illustrating an image processing apparatus according to an exemplary embodiment.

FIG. 1 is a block diagram illustrating an image processing apparatus according to an exemplary embodiment. FIG. 2 is a detailed block diagram illustrating an image processing apparatus according to an exemplary embodiment.

As illustrated in FIG. 1, an image processing apparatus is an apparatus which generates a 3D image from an externally received image. The image processing apparatus may be implemented with a display apparatus configured to display an image or a terminal apparatus configured to provide an externally received image to a display apparatus configured to display an image. The image processing apparatus includes a receiver 110 and a controller 120. The receiver 110 receives a source image and depth information of the source image from an outside source. Here, the source image may be a two-dimensional (2D) image. The depth information of the source image is information extracted from a foreground image and a background image of the source image. The depth information may be acquired in the image processing apparatus through a camera capturing the source image or by a user operation.

The controller 120 uses the received source image and depth information of the source image to generate a left-eye image and a right-eye image with respect to the source image. The controller 120 may include a region determination unit 121, a weighting unit 122, a depth image generator 123, and a 3D image generator 124. The controller 120 may generally control an operation of the respective components.

The region determination unit 121 determines an overlapping region and a hole region. In the overlapping region a plurality of pixels overlap one another and portions of pixels forming the source image are shifted according to the depth information received through the receiver 110. The hole region is generated by shifting portions of the pixels of the source image according to the depth information.

Specifically, when the source image and the depth information for the source image are received through the receiver 110, the region determination unit 121 left-shifts and right-shifts the pixels of the source image based on the depth information to generate a left-eye image and a right-eye image with respect to the received source image. Therefore, the region determination unit 121 may determine the overlapping region and the hole region generated by left-shifting and right-shifting the pixels of the source image based on the depth information.

In other words, the source image includes the foreground image and the background image and the region determination unit 121 may determine, as the overlapping region, a section in which some pixels among pixels of the foreground image overlap some pixels among pixels of the background image The region determination unit 121 may determine, as the hole region, a section in which there are no pixels of the foreground image or no pixels of the background image. Hereinafter, with reference to FIGS. 3 to 8, the operation of the region determination unit 121 shifting the pixels of the source image and determining the overlapping region and the hole region will be described in detail. First, with reference to FIGS. 3 to 5, the region determination unit's 121 operation of shifting the pixels of the source image and determining the hole region will be described in detail.

Figure 3:
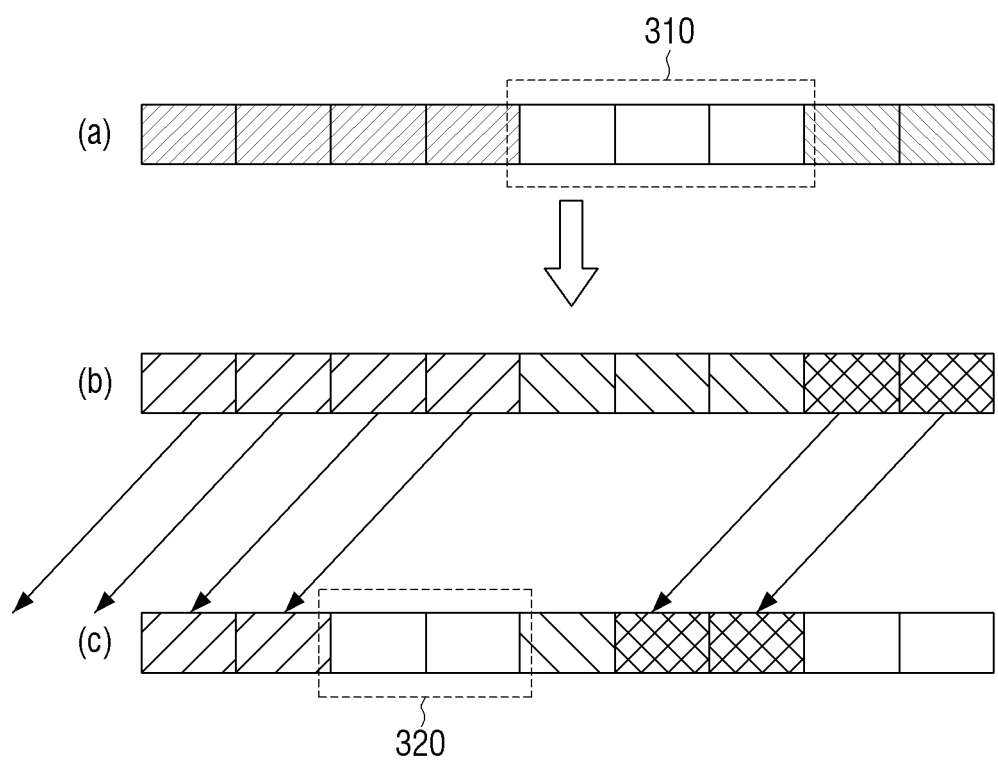
FIG. 3 is an illustrative view illustrating an example of determining a hole region from a left-shifted source image according to an exemplary embodiment.
Figure 4:
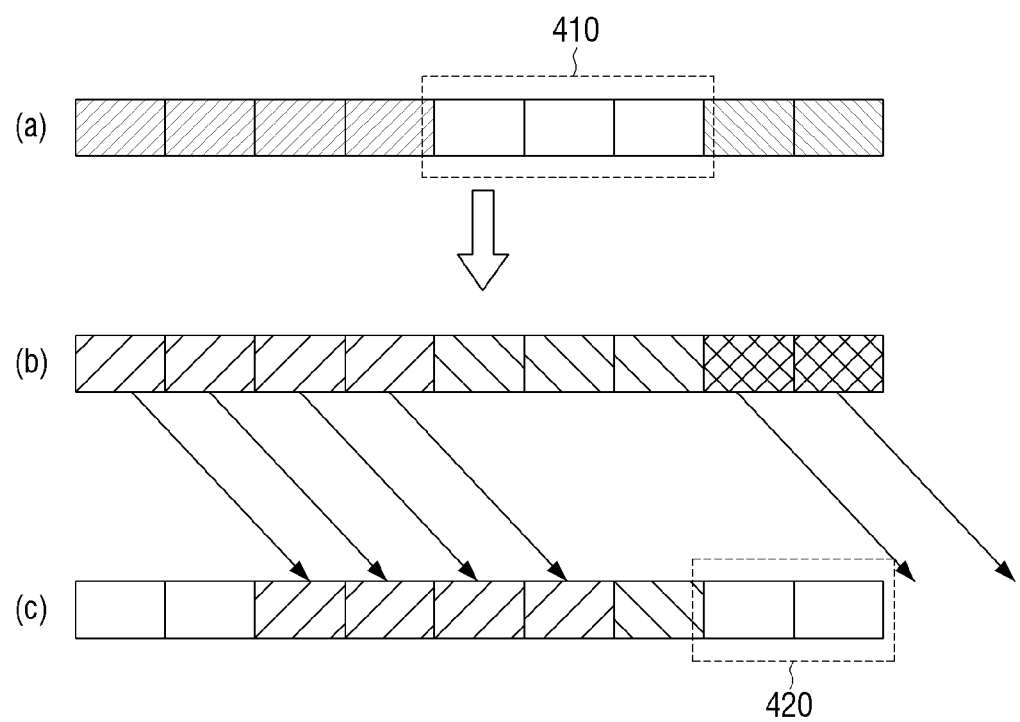
FIG. 4 is an illustrative view illustrating an example of determining a hole region from a right-shifted source image according to an exemplary embodiment.

FIG. 3 is an illustrative view illustrating an example of determining a hole region from a left-shifted source image according to an exemplary embodiment. FIG. 4 is an illustrative view illustrating an example of determining a hole region from a right-shifted source image according to an exemplary embodiment.

FIG. 3 illustrates depth information (a), a source image (b), and a shift image (c) in which some pixels of the source image (b) are left-shifted. The depth information (a) is information in which depth values are allocated to respective pixels of a foreground region 310 and a background region (a remaining region other than the foreground region) based on a gray level. Therefore, to generate a right-eye image, the region determination unit 121 may left-shift pixels of the source image (b) corresponding to pixels of the background region of the depth information (a) based on the depth information (a). The shift image (c) for generating the right-eye image may be generated, through the left-shifting of the pixels of the source image (b) corresponding to the pixels of the background region of the depth information (a). That is, the third and fourth pixels of the source image (b) may be left-shifted and moved to the first and second pixels of the shift image (c). The fifth, sixth, and seventh pixels corresponding to the foreground region 310 of the depth information (a) among the pixels of the source image (b) are not left-shifted. Accordingly, the first and second pixels of the shift image (c) are changed into the third and fourth pixels of the source image (b) and the fifth, sixth, and seventh pixels of the shift image (c) are maintained as the fifth, sixth, and seventh pixels of the source image (b). As a result, a hole 320 is generated in a section of the shift image (c) in which the third and fourth pixels are arranged. Therefore, the region determination unit 121 may determine, from the shift image (c), that the section in which the hole 320 is generated is a hole region for the right-eye image.

FIG. 4 illustrates depth information (a), a source image (b), and a shift image (c) in which some pixels of the source image (b) are right-shifted based on the depth information (a). Specifically, to generate a left-eye image, the region determination unit 121 may right-shift pixels of the source image (b) corresponding to pixels of a background region of the depth information (a) based the depth information (a). The shift image (c) for generating the left-eye image may be generated, through the right-shifting of the pixels of the source image (b) corresponding to the pixels of the background region of the depth information (a). That is, the eighth and ninth pixels of the source image (b) may be right-shifted and move to tenth and eleventh pixels of the shift image (c). The fifth, sixth, and seventh pixels corresponding to a foreground region 410 of the depth information (a) among the pixels of the source image (b) are not right-shifted. Therefore, the tenth and eleventh pixels of the shift image (c) are changed into the eighth and ninth pixels of the source image (b) and the fifth, sixth, and seventh pixels of the shift image (c) are maintained as the fifth, sixth, and seventh pixels of the source image (b). As a result a hole 420 is generated in a section of the shift image (c) in which the eighth and ninth pixels are arranged. Therefore, the region determination unit 121 may determine, from the shift image (c), that the section in which the hole 420 is generated is a hole region for the left-eye image.

As described above, when the hole regions are determined through the left-shifting and the right-shifting of the source image according to the depth information, the region determination unit 121 may predict a left hole map and a right hole map based on the determined hole regions. While, the exemplary embodiment has only described determining the hole regions by shifting the pixels of the background region, the determination of the hole regions is not limited thereto and the holes regions may be determined by shifting pixels of the foreground region as well.

Figure 5:
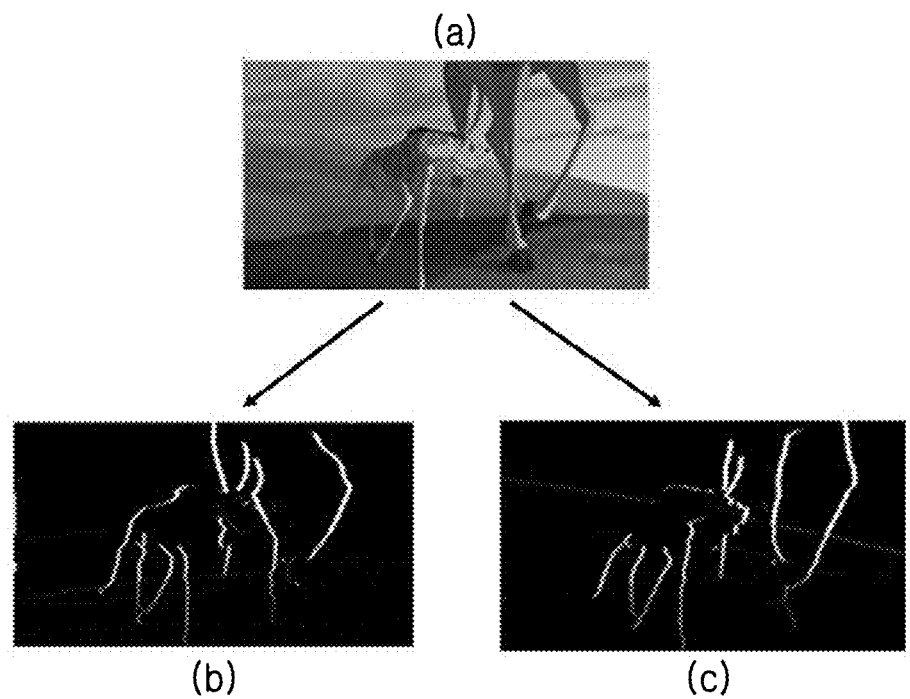
FIG. 5 is an illustrative view illustrating a left-hole map and a right-hole map with respect to a source image based on a predetermined hole region according to an exemplary embodiment.

FIG. 5 is an illustrative view illustrating a left hole map (b) and a right hole map (c) with respect to the source image (a) based on predetermined hole regions according to an exemplary embodiment.

Specifically, as described in FIGS. 3 and 4, the region determination unit 121 may determine a hole region generated by left-shifting or right-shifting some pixels of pixels forming the source image (a) based on depth information. Therefore, the left hole map (b) may be generated based on the hole region generated according to the left-shifting of some pixels of the source image (a) and the right hole map (c) may be generated based on the hole region generated according to the right-shifting of some pixels of the source image (a).

Hereinafter, an operation of shifting pixels forming the source image and determining an overlapping region will be described in detail with reference to FIGS. 6 to 8.

Figure 6:
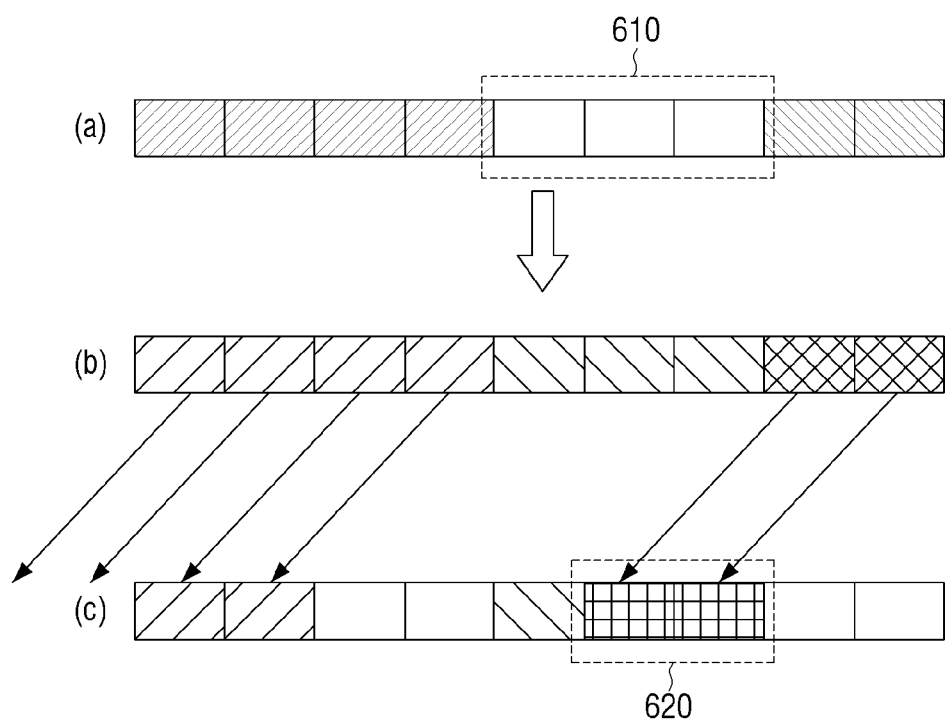
FIG. 6 is an illustrative view illustrating an example of determining an overlapping region from a left-shifted source image according to an exemplary embodiment.

FIG. 6 is an illustrative view illustrating an example of determining an overlapping region from a left-shifted source image according to an exemplary embodiment.

Figure 7:
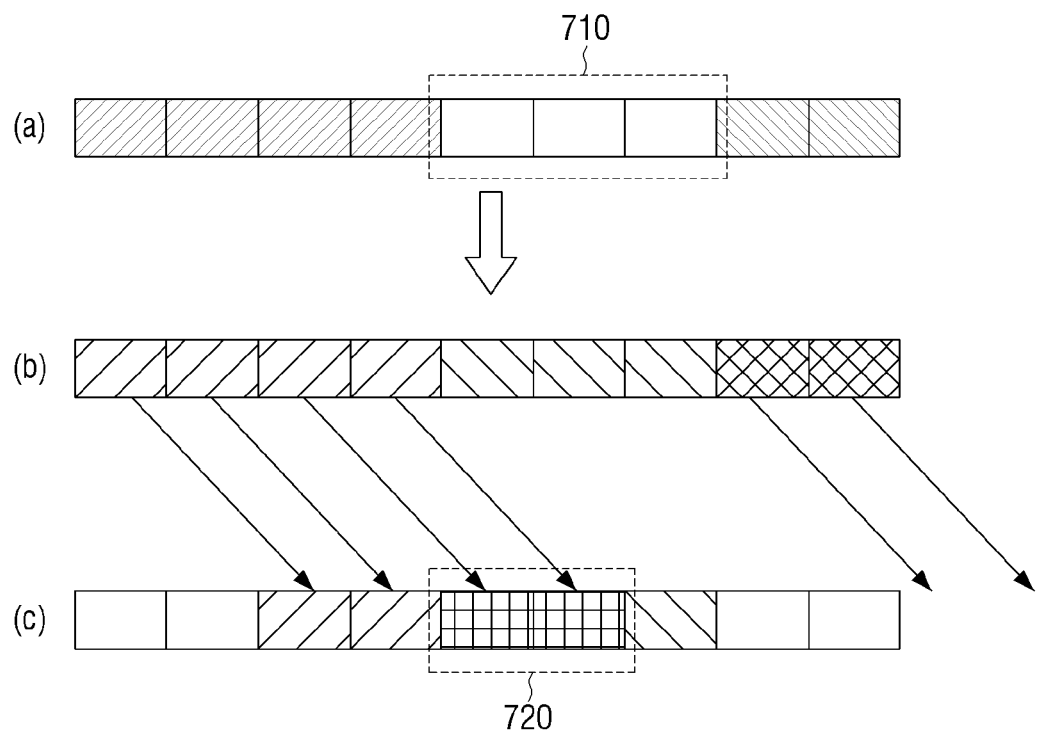
FIG. 7 is an illustrative view illustrating an example of determining an overlapping region from a right-shifted source image according to an exemplary embodiment.

FIG. 7 is an illustrative view illustrating an example of determining an overlapping region from a right-shifted source image according to an exemplary embodiment.

FIG. 6 illustrates depth information (a), a source image (b), and a shift image (c) in which some pixels of pixels forming the source image (b) are left-shifted based on the depth information (a). As described above, the depth information (a) is information in which depth values are allocated to pixels of a foreground region 610 and a background region (a remaining region other than the foreground region) based on a gray level. Therefore, to generate a right-eye image, the region determination unit 121 may left-shift pixels of the source image (b) corresponding to pixels of the background region of the depth information (a) based on the depth information (a). The shift image (c) for generating the right-eye image may be generated, through the left-shifting of the pixels of the source image (b) corresponding to the pixels of the background region of the depth information (a). That is, the eighth and ninth pixels of the source image (b) may be left-shifted and move to sixth and seventh pixels of the shift image (c). The fifth, sixth, and seventh pixels corresponding to the foreground region 610 of the depth information (a) among the pixels of the source image (b) are not left-shifted.

The fifth, sixth, and seventh pixels of the shift image (c) may be maintained as the fifth, sixth, and seventh pixels of the source image (b). However, as described above, the sixth and seventh pixels of the shift image (c) are changed into the eighth and ninth pixels of the source image (b) and thus the sixth and seventh pixels of the shift image (c) may be pixels in which the eighth and ninth pixels of the source image (b) and the sixth and seventh pixels of the source image (b) overlap each other.

Therefore, the region determination unit 121 may determine, from the shift image (c), that the section in which an overlapping section 620 is generated is an overlapping region for the right-eye image.

FIG. 7 illustrates depth information (a), a source image (b), and a shift image (c) in which some pixels of the source image (b) are right-shifted based on the depth information (a). Specifically, to generate a left-eye image, the region determination unit 121 may right-shift pixels of the source image (b) corresponding to pixels of a background region of the depth information (a) based the depth information (a). The shift image (c) for generating the left-eye image may be generated, through the right-shifting of the pixels of the source image (b) corresponding to the pixels of the background region of the depth information (a). That is, the first, second, third, and fourth pixels of the source image (b) may be right-shifted and moved to the third, fourth, fifth, and sixth pixels of the shift image (c). The fifth, sixth, and seventh pixels corresponding to a foreground region 710 of the depth information (a) among the pixels of the source image (b) are not right-shifted. Therefore, the fifth, sixth, and seventh pixels of the shift image (c) may be changed into the fifth, sixth, and seventh pixels of the source image (b). However, as described above, since the first, second, third, and fourth pixels of the source image (b) are right-shifted and moved to the third, fourth, fifth, and sixth pixels of the shift image (c), the fifth and sixth pixels of the shift image (c) may be pixels in which the fifth and sixth pixels of the source image (b) and the third and fourth pixels of the source image (b) overlap each other. Therefore, the region determination unit 121 may determine, from the shift image (c), that the section in which an overlapping section 720 is generated is an overlapping region for the left-eye image.

As described above, when the overlapping regions are determined through the left-shifting and the right-shifting of the source image according to the depth information, the region determination unit 121 may predict a left overlapping map and a right overlapping map based on the determined overlapping regions. While the exemplary embodiment has only described determining the overlapping regions by shifting the pixels of the background region, the determination of the overlapping regions is not limited thereto and the overlapping regions may be determined by shifting pixels of the foreground region as well.

Figure 8:
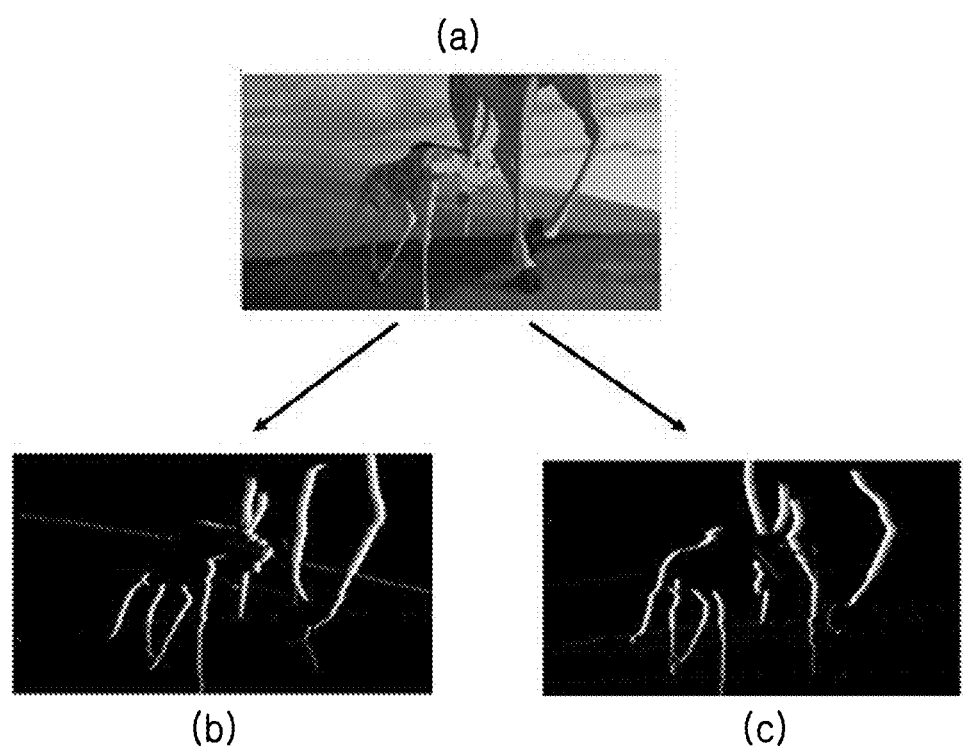
FIG. 8 is an illustrative view illustrating a left-overlapping map and a right-overlapping map with respect to a source image based on a predetermined overlapping region according to an exemplary embodiment.

FIG. 8 is an illustrative view illustrating a left overlapping map (b) and a right overlapping map (c) with respect to the source image (a) based on predetermined overlapping regions according to an exemplary embodiment.

Specifically, as described in FIGS. 6 and 7, the region determination unit 121 may determine an overlapping region generated by left-shifting or right-shifting some pixels of pixels forming the source image (a) based on depth information. Therefore, the left overlapping map (b) may be generated based on the overlapping region generated according to the left-shifting of some pixels of the source image (a) and the right overlapping map (c) may be generated based on the overlapping region generated according to the right-shifting of some pixels of the source image (a).

As described above, the weighting unit 122 calculates a weight for each pixel included in the overlapping region of the source image as determined by the region determination unit 121 based on distance information with respect to the foreground region and the background region. However, the present disclosure is not limited thereto and the weighting unit 122 may calculate a weight for each pixel included in the hole region determined through the region determination unit 121 based the distance information with respect to the foreground region and the background region. In exemplary embodiments, the weighting unit 122 may calculate weights for the pixels included in each of the overlapping region and the hole region using a trilateral filter.

That is, the weighting unit 122 calculates the weight so that pixels of the overlapping region that are closer to the foreground region have higher weights and pixels of the overlapping region that are closer to the background region have lower weights. The foreground region and the background region are regions in which a foreground image and a background image of the source image are displayed. Therefore, the weighting unit 122 may calculate the weight so that the pixels of the overlapping region which are closer to the foreground region have weights closer to values of the pixels of the foreground image and the pixels of the background region which are closer to the background region have weights closer to values of the pixel of the background image. When calculating weights for the pixels of the hole region, the weighting unit 122 may calculate the weights for the pixels of the hole region in the same manner as the weight calculating method for the overlapping region.

The depth image generator 123 generates a foreground-depth image in which the foreground region is extended and a background-depth image in which the background region is extended. The foreground-depth image and the background-depth image are generated based on the depth information and the overlapping region determined through the region determination unit 121. The depth image generator 123 extends the foreground region by sections in which the overlapping region and the hole region are generated and generates the foreground-depth image, so that the weights are applied to the pixels of the overlapping and hole regions calculated through the weighting unit 122 as described above. Similarity, the depth image generator 123 extends the background region by sections in which the overlapping region and the hole region are generated and generates the background-depth image, so that the weights are applied to the pixels of the overlapping and hole regions.

Hereinafter, with reference to FIG. 9, a method of generating a foreground-depth image in which a foreground region is extended and a background-depth image in which a background region is extended will be described in detail.

Figure 9:
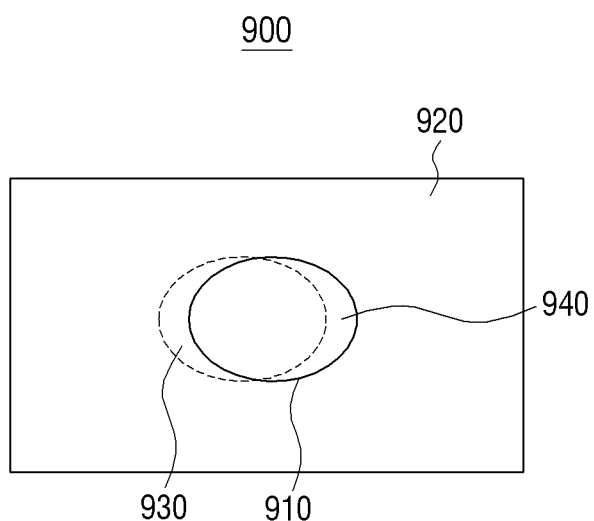
FIG. 9 is an illustrative view illustrating an example of determining a foreground-depth image in which a foreground region is extended and a background-depth image in which a background region is extended according to an exemplary embodiment.

As illustrated in FIG. 9, a source image 900 may include a foreground image 910 and a background image 920. When pixels of the background image 920 are right-shifted, a left region, which is an overlapping region 930, may be generated on the basis of the foreground image 910, and a right region, which is a hole region 940, may be generated. When the overlapping region 930 and the hole region 940 are generated, the depth image generator 123 generates the foreground-depth image and a background-depth image in order to determine weights for pixels of the overlapping region 930 and the hole region 940. The foreground-depth image is an image in which the foreground region is extended and the background-depth image is an image in which the background region is extended. Therefore, the foreground-depth image may be extended so that the overlapping region 930 is included in the foreground region in which the foreground image 910 is displayed and the background-depth image may be extended so that the hole region 940 is included in the background region in which the background image 920 is displayed.

As described above, the depth image generator 123, which generates the foreground-depth image and the background-depth image, may generate the foreground-depth image and the background-depth image for each of a left-eye image and a right-eye image generated from the source image.

As described above, when the foreground-depth image and the background-depth image are generated, the 3D image generator 124 generates the foreground image for each of the left-eye image and the right-eye image using the source image and the foreground-depth image. Further, the 3D image generator 124 generates the background image for each of the left-eye image and the right-eye image using the source image and the background-depth image. Based on the weights calculated in the weighting unit 122, the 3D image generator 124 synthesizes the foreground image and the background image for each of the left-eye image and the right-eye image. Specifically, the 3D image generator 124 adjusts pixel values for the pixels of the overlapping region based on the previously calculated weights when the foreground image and the background image for each of the left-eye image and the right-eye image are generated. That is, the 3D image generator 124 may adjust a pixel of a region having a high weight (first weight) among the pixels of the overlapping region based on the pixel value of the foreground image and adjust a pixel of a region having a low weight (second weight) among the pixels of the overlapping region based on the pixel value of the background image. The 3D image generator 124 may synthesize the foreground image and the background image for each of the left-eye image and the right-eye image and generate the left-eye image and the right-eye image with respect to the source image.

The controller 120, which controls the above-described components to generate the left-eye image and the right-eye image from the source image and the depth information in the image processing apparatus, may further include an additional configuration as illustrated in FIG. 2. Specifically, the controller 120 may further include a noise processing unit 125, a pre-processing unit 126, and a post-processing unit 127.

The noise processing unit 125 removes noise for the overlapping region and the hole region determined from the region determination unit 121. In exemplary embodiments, the noise processing unit 125 may remove the noise component for the overlapping region and the hole region using a Gaussian filter. Specifically, as described above with reference to FIG. 5, a left hole map and a right hole map may be generated based on the hole region generated by shifting some of the pixels of the source image based on the depth information. When the left hole map and the right hole map are generated based on the hole region, noise may be generated in the hole region used for the left and right hole maps. Further, as described above with reference to FIG. 8, a left overlapping map and a right overlapping map may be formed based on the overlapping region generated by shifting some pixels of the source image based on the depth information. When the left-overlapping map and the right overlapping map are generated based on the overlapping region, noise may be generated in the overlapping region used for the left and right overlapping maps.

Therefore, the noise processing unit 125 may remove the noise generated in the hole region and the overlapping region using a noise removing filter such as a Gaussian filter. When the noise generated in the hole region and the overlapping region is removed through the noise removing filter 125, the above-described weighting unit 122 may calculate a weight for each pixel in the noise-removed hole region and overlapping region.

The pre-processing unit 126 performs pre-processing on the depth information based on the hole region and the overlapping region in which the noise is removed through the noise processing unit 125. The pre-processing unit 126 is a processing unit configured to acquire the noise-removed depth information and in exemplary embodiments, the pre-processing unit 126 may perform the pre-processing on the depth information using a smoothing filter such as a low pass filter. Although it is described that pre-processing unit 126 of the exemplary embodiment performs the pre-processing on the depth information using the noise-removed hole region and overlapping region, this disclosure is not limited thereto. Specifically, the pre-processing unit 126 may perform the pre-processing on the depth information which does not have the noise-removed hole region and overlapping region.

That is, the pre-processing unit 126 may simply apply a smoothing filter such as a low pass filter to the depth information.

When the pre-processing is performed on the depth information through the pre-processing unit 126 as described above, the depth image generator 123 may generate the foreground-depth image in which the foreground region is extended and the background-depth image in which the background region is extended based on the depth information pre-processed through the pre-processing unit 123, the overlapping region, and the hole region.

When the foreground-depth image in which the foreground region is extended and the background-depth image in which the background region is extended are generated, the post-processing unit 127 performs post-processing on the foreground-depth image and the background-depth image. The post-processing unit 127 is a processing unit configured to acquire a noise-removed foreground-depth image and background-depth image and in exemplary embodiments, the post-processing unit 127 may remove noise for the foreground-depth image and the background-depth image using a smoothing filter such as a low pass filter. When the noise for the foreground-depth image and the background-depth image is removed through the post-processing unit 127, the 3D image generator 124 generates a foreground image for each of a left-eye image and a right-eye image using the source image and the noise-removed foreground-depth image and a background image for each of the left-eye image and the right-eye image using the source image and the noise-removed background-depth image. Subsequently, the 3D image generator 124 may synthesize the foreground image and the background image for each of the left-eye image and the right-eye image and generate the left-eye image and the right-eye image with respect to the source image.

The operation of generating the 3D image for the source image has been described, that is, the left-eye image and the right-eye image through respective components of the image processing apparatus according to the exemplary embodiment. Hereinafter, a method of generating the left-eye image and the right-eye image for the source image in the image processing apparatus will be described in detail.

Figure 10:
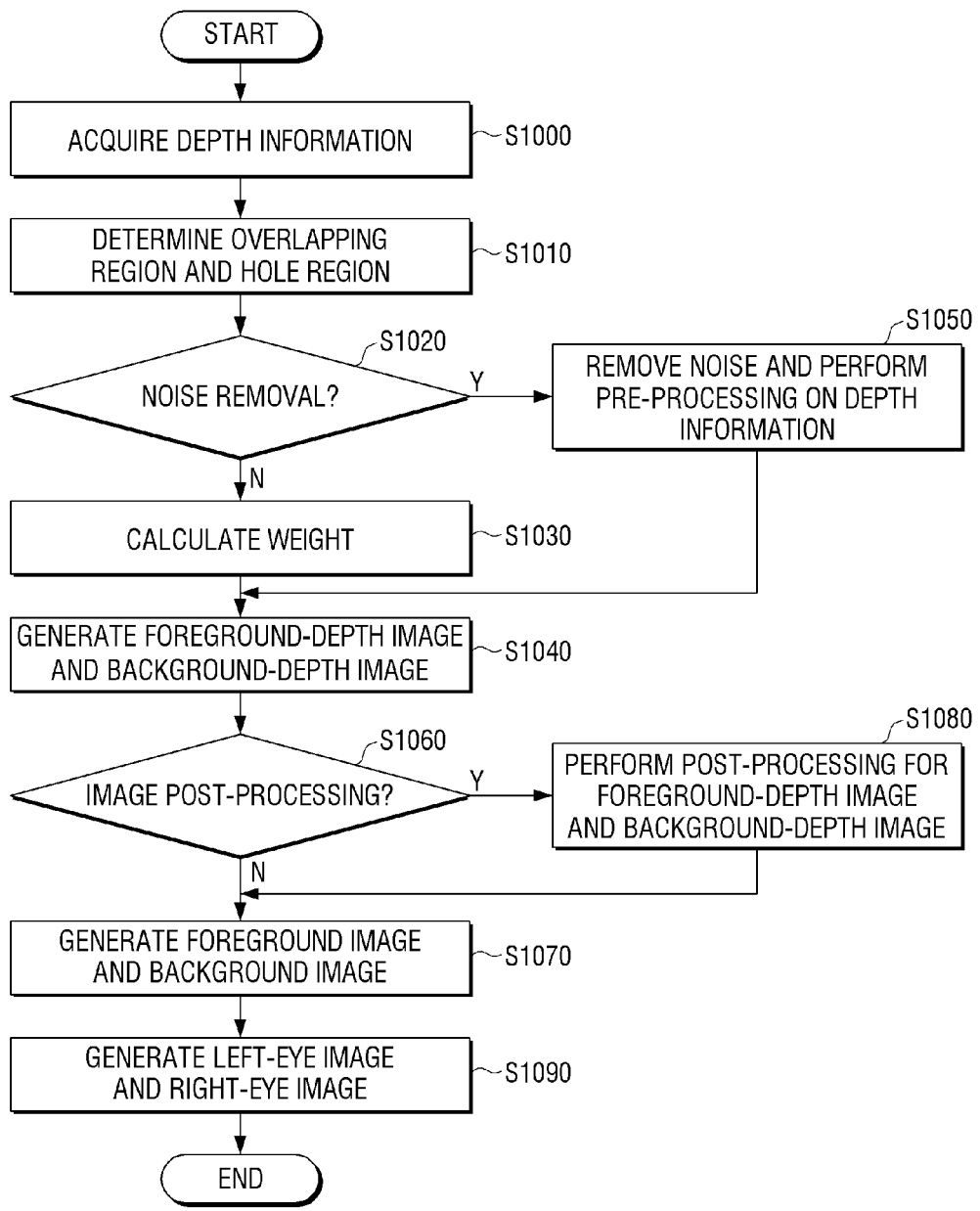
FIG. 10 is a flowchart illustrating a 3D image generating method in an image processing apparatus according to an exemplary embodiment.

FIG. 10 is a flowchart illustrating a method of generating a 3D image in an image processing apparatus according to an exemplary embodiment.

As illustrated in FIG. 10, the image processing apparatus receives a source image from the outside and acquires depth information for the received source image (S1000). The source image may be a 2D image. The depth information of the source image is information extracted from foreground and background images of the source image and the depth information may be acquired from the image processing apparatus through a camera capturing the source image or by a user operation.

When the source image and the depth information for the source image are acquired, the image processing apparatus determines an overlapping region in which some of the pixels forming the source image are shifted according to the depth information and a plurality of pixels overlap (S1010). The image processing apparatus may also determine a hole region which is generated by shifting some of the pixels forming the source image according to the depth information. Specifically, the image processing apparatus left-shifts and right-shifts the some pixels of the source image based on the depth information to generate a left-eye image and a right-eye image with respect to the received source image. Thus, the image processing apparatus may determine, based on the depth information, the overlapping region and the hole region generated by left-shifting and right-shifting the some pixels of the source image.

That is, the image processing apparatus may determine, as the overlapping region, a section in which some pixels of the foreground image of the source image and some pixels of the background image of the source image overlap each other. The image processing apparatus may determine, as the hole region, a section in which there is no pixel of the foreground image or pixel of the background image.

The method of shifting the pixels of the source image and determining the overlapping region and hole region has been described with reference to FIGS. 3 to 8 and thus detailed description thereof will be omitted.

When the overlapping region and the hole region with respect to the source image are determined based on the depth information in step S1010, the image processing apparatus determines whether or not to remove noise from the previously determined overlapping region and hole region (S1020). When it is determined from a determination result that a process of removing the noise is not to be performed on the overlapping region and the hole region, the image processing apparatus calculates a weight for each pixel included in the overlapping region based on distance information with respect to the foreground region and the background region (S1030). However, the weight calculating method is not limited thereto and the image processing apparatus may calculate the weight for each pixel included in the hole region based on the distance information with respect to the foreground region and the background region. The weight calculation may be executed by one or more processors.

In exemplary embodiments, the image processing apparatus may calculate the weight for each pixel included in the overlapping region and the hole region using a trilateral filter. That is, image processing apparatus may calculate, using the trilateral filter, the weight so that pixels of the overlapping region which are closer to the foreground region have higher weights and pixels of the overlapping region which are closer to the background region have lower weights. Here, the foreground region and the background region are regions in which the foreground and background images of the source image are displayed. Therefore, the image processing apparatus may calculate the weight so that the pixels of the overlapping region which are closer to the foreground region have weights closer to values of the pixels of the foreground image and the pixels of the overlapping region which are closer to the background region have weights closer to values of the pixels of the background image. When the weights for the pixels of the hole region are calculated, the image processing apparatus may calculate the weights for the pixels of the hole region in the same manner as the method of calculating the weights for the pixels of the overlapping region.

When the weights for the pixels of the overlapping region and the hole region are calculated as described above, the image processing apparatus may generate a foreground-depth image in which the foreground region is extended and the background-depth image in which the background region is extended based on the depth information and the overlapping region (S1040). That is, the image processing apparatus extends the foreground region by sections in which the overlapping and hole regions are generated and generates the foreground-depth image so that the weights for the pixels of the overlapping and hole regions are applied. Similarly, the image processing apparatus extends the background region by sections in which the overlapping and hole regions are generated and generates the background-depth image so that the weights for the pixels of the overlapping and hole regions are applied. The method of generating the foreground-depth image in which the foreground region is extended and the background-depth image in which the background region is extended has been described in detail with reference to FIG. 9 and thus detailed description thereof will be omitted.

When it is determined from the determination result in step S1020 that the processing of removing the noise for the overlapping region and the hole region is to be performed, the image processing apparatus removes the noise for the overlapping and hole regions determined through step S1010. Subsequently, the image processing apparatus performs pre-processing on the depth information based on the noise-removed overlapping and hole regions (S1050). Specifically, the image processing apparatus may remove the noise components generated in the overlapping and hole regions using a Gaussian filter. When the noise for the overlapping and hole regions is removed as described above, the image processing apparatus performs the pre-processing on the depth information based on the noise-removed overlapping and hole regions. This is to acquire the noise-removed depth information and in exemplary embodiments, the image processing apparatus may perform pre-processing on the depth information using a smoothing filter such as a low pass filter. While only a description of performing the pre-processing on the depth information using the noise-removed hole region and overlapping region has been described, the present disclosure is not limited thereto and the image processing apparatus may perform the preprocessing using the smoothing filter without using the noise-removed hole region and overlapping region.

When the removing noise for the hole region and the overlapping region and the pre-processing for the depth information are performed through step S1050 as described above, the image processing apparatus may generate the foreground-depth image in which the foreground region is extended and the background-depth image in which the background region is extended based on the pre-processed depth information and the noise removed-overlapping region and hole region in step S1040 described above.

The image processing apparatus determines whether or not to perform post-processing on the foreground-depth image in which the foreground region is extended and the background-depth image in which the background region is extended (S1060). When it is determined from a determination result that the post-processing is not to be performed, the image processing apparatus generates a foreground image using the source image and a foreground-depth image and generates a background image using the source image and a background-depth image (S1070). Specifically, the foreground-depth image and the background-depth image may be generated with regard to a lift-eye image and a right-eye image to be generated from the source image. That is, the foreground-depth image and the background-depth image for the left-eye image and the right-eye image may be generated. Therefore, image processing apparatus generates the foreground image of the left-eye image using the source image and the foreground-depth image for the left-eye image and generates the background image of the left-eye image using the source image and the background-depth image for the left-eye image. Similarly, the image processing apparatus generates the foreground image of the right-eye image using the source image and the foreground-depth image for the right-eye image and generates the background image of the right-eye image using the source image and the background-depth image for the right-eye image. Therefore, the foreground images and the background images for the left eye-image and the foreground images and the background images for the right-eye image may be generated.

When it is determined from step S1060 that the post-processing is to be performed on the depth images, the image processing apparatus performs post-processing on the foreground-depth image in which the foreground region is extended and the background-depth image in which the background region is extended (S1080). The post-processing process is to acquire the noise-removed foreground-depth image and background-depth image and in exemplary embodiments, the image processing apparatus may remove the noise for the foreground-depth image and the background-depth image using a smoothing filter such as a low pass filter. When the noise for the foreground-depth image and the background-depth image is removed as described above, the image processing apparatus may generate the foreground images for the left-eye image and the right-eye image from the source image and the noise-removed foreground-depth image and generate the background images for the left-eye image and the right-eye image from the source image and the noise-removed background-depth image through step S1070 as described above.

When the foreground images for the left-eye image and the right-eye image and the background images for the left-eye image and the right-eye image are generated as described above, the image processing apparatus synthesizes the foreground images for the left-eye image and the right-eye image and the background images for the left-eye image and the right-eye image according to the weights calculated in step S1030 and generates the left-eye image and the right-eye image with respect to the source image (S1090).

Specifically, when the foreground images for the left-eye image and the right-eye image and the background images for the left-eye image and the right-eye image are generated, the image processing apparatus adjusts pixel values for the pixels of the overlapping region based on the previously calculated weights. That is, the image processing apparatus adjusts a pixel value for a pixel of a region having the high weight among the pixels of the overlapping region based on a pixel value of the foreground image and adjusts a pixel value for a pixel of a region having a low weight among the pixels of the overlapping region based on a pixel value of the background image.

Subsequently, the image processing apparatus synthesizes the foreground images for the left-eye image and the right-eye image and the background images for the left-eye image and the right-eye image and generates the left-eye image and the right-eye image with respect to the source image.

As described above, the image processing apparatus may adjust the pixel values for the pixels of the overlapping region based on the previously calculated weights and synthesizes the foreground images for the left-eye image and the right-eye image and the background images for the left-eye image and the right-eye image into one image, so that the foreground image and the background image may be synthesized into one image more naturally.

The foregoing exemplary embodiments and advantages are merely exemplary and are not to be construed as limiting the present disclosure. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method for generating a three-dimensional (3D) image, the method comprising:
   acquiring a source image and depth information of the source image;
   determining, by shifting some pixels of the source image according to the depth information, an overlapping region in which a plurality of pixels overlap and a hole region in which there are no pixels, and
   calculating a weight for the overlapping region with a processor, using distance information with respect to a foreground region of the source image and a background region of the source image;
   generating, using the depth information and at least one of the overlapping region and the hole region, a foreground-depth image in which the foreground region is extended and a background-depth image in which the background region is extended;
   generating a foreground image using the source image and the foreground-depth image;
   generating a background image using the source image and the background-depth image; and
   generating, using the weight from the overlapping region, at least one of a left-eye image and a right-eye image with respect to the source image by synthesizing the foreground image and the background image.

2. The method as claimed in claim 1, wherein the calculating a weight includes calculating the weight so that among the pixels of the overlapping region, pixels closer to the foreground region have higher weights than pixels closer to the background region.

3. The method as claimed in claim 2, wherein the generating one of a left-eye image and a right-eye image with respect to the source image includes adjusting a pixel value of a region having a first weight among the overlapping region based on a pixel value of the foreground image and adjusting a pixel value of a region having a second weight among the overlapping region based on a pixel value of the background image, and
   wherein the first weight is higher than the second weight.

4. The method as claimed in claim 1, further comprising, in response to determining the overlapping region and the hole region, removing noise from the overlapping region and the hole region.

5. The method as claimed in claim 4, further comprising, in response to removing the noise from the overlapping region and the hole region, performing pre-processing on the depth information based on the noise-removed overlapping region and hole region.

6. The method as claimed in claim 1, further comprising, in response to generating the foreground-depth image in which the foreground region is extended and the background-depth image in which the background region is extended, performing post-processing on the foreground-depth image and the background-depth image.

7. The method as claimed in claim 1, wherein the source image is a two-dimensional (2D) image.

8. An image processing apparatus which generates a three-dimensional (3D) image, the image processing apparatus comprising:
   a receiver configured to receive a source image and depth information of the source image;
   a region determination unit configured to determine, by shifting some pixels of the source image according to the depth information, an overlapping region in which a plurality of pixels overlap and a hole region in which there are no pixels;
   a weighting unit configured to calculate, using distance information with respect to a foreground region of the source image and a background region of the source image, a weight of the determined overlapping region;
   a depth image generator configured to generate, using the depth information and at least one of the overlapping region and the hole region, a foreground-depth image in which the foreground region is extended and a background-depth image in which the background region is extended; and
   a 3D image generator configured to: generate a foreground image using the source image and the foreground-depth image; generate a background image using the source image and the background-depth image; synthesize, using the calculated weight, the foreground image and the background image; and generate at least one of a left-eye image and a right-eye image with respect to the source image.

9. The image processing apparatus as claimed in claim 8, wherein the weighting unit is configured to calculate the weight so that among the pixels of the overlapping region, pixels closer to the foreground region have higher weights than pixels closer to the background region.

10. The image processing apparatus as claimed in claim 9, wherein the 3D image generator is further configured to: adjust, using a pixel value of the foreground image, a pixel value of a region having a first weight among the overlapping region; and adjust, using a pixel value of the background image, a pixel value of a region having a second weight among the overlapping region, and
    wherein the first weight is higher than the second weight.

11. The image processing apparatus as claimed in claim 8, further comprising a noise processing unit configured to remove noise from the overlapping region and the hole region.

12. The image processing apparatus as claimed in claim 11, further comprising a pre-processing unit configured to perform pre-processing on the depth information using the noise-removed overlapping region and the noise-removed hole region.

13. The image processing apparatus as claimed in claim 8, further comprising a post-processing unit configured to perform post-processing on the foreground-depth image and the background-depth image,
    wherein, in response to the foreground-depth image in which the foreground region is extended and the background-depth image in which the background region is extended being generated, the post-processing unit performs the post-processing on the foreground-depth image and the background-depth image.

14. The image processing apparatus as claimed in claim 8, wherein the source image is a two-dimensional (2D) image.

15. An image processing apparatus which generates a three-dimensional (3D) image, the image processing apparatus comprising:
    a receiver configured to receive a source image and depth information associated with the source image, the source image including a foreground region in which a foreground image is displayed and a background region in which a background image is displayed, the depth information indicating the foreground region and the background region; and
    a controller configured to generate the 3D image by performing a pixel shifting operation in which pixels of one of the foreground region and the background region are shifted by a predetermined number of pixels without shifting pixels of the other region, to determine, based on the pixel shifting operation, at least one of an overlapping region in which pixels overlap and a hole region in which there are no pixels, and to generate a left-eye image and a right-eye image using the foreground image, the background image, and at least one of the overlapping region and the hole region.

* * * * *